(12) United States Patent
Verhoeven et al.

(10) Patent No.: US 6,717,369 B2
(45) Date of Patent: Apr. 6, 2004

(54) DRIVER CIRCUIT WITH LOAD DISCHARGE DETECTION

(75) Inventors: Ben Verhoeven, Cuijk (NL); Alfred Grakist, Oosterbeek (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/170,112

(22) Filed: Jun. 11, 2002

(65) Prior Publication Data

US 2003/0227260 A1 Dec. 11, 2003

(51) Int. Cl.$^7$ ................................................. G09G 3/10
(52) U.S. Cl. ..................... 315/169.3; 315/291; 315/307; 315/DIG. 2
(58) Field of Search ................................ 315/169.3, 291, 315/307, 209 R, 224, DIG. 2, DIG. 5, DIG. 7

(56) References Cited

U.S. PATENT DOCUMENTS

| | | | | |
|---|---|---|---|---|
| 4,794,272 A | * | 12/1988 | Bavaro et al. | ................. 307/66 |
| 6,081,075 A | | 6/2000 | Littlefield | ............... 315/209 R |
| 6,262,494 B1 | * | 7/2001 | Tsukuni et al. | ................. 307/80 |
| 6,320,323 B1 | | 11/2001 | Buell et al. | ............... 315/169.3 |
| 6,414,403 B2 | * | 7/2002 | Kitagawa et al. | .............. 307/66 |

OTHER PUBLICATIONS

"High Voltage EL Lamp Driver", Supertex inc., HV824 Advanced Information, pp. 15–25, 15–26, 15–27.
"Data Sheet D371A Electroluminescent Lamp Driver IC, MSOP–10 Preliminary", pp. 1–8, Durel Corporation, Chandler, AZ.

* cited by examiner

Primary Examiner—Tuyet T. Vo
(74) Attorney, Agent, or Firm—Michael J. Ure

(57) ABSTRACT

The present invention provides a driver circuit with load discharge detection particularly suitable for use with electroluminescence (EL) lamps. The driver circuit determines the moment at which the load has been discharged by a defined discharge current. This information is used to start the new charging cycle of the load. The discharge time adapts itself to different load sizes or load voltages. Also, a minimum amount of time is used to discharge the load, so that a maximum amount of time is available for charging the load at a predetermined frequency. As a result, a higher performance can be achieved.

14 Claims, 6 Drawing Sheets

DRIVER CIRCUIT WITH LOAD DISCHARGE DETECTION

BACKGROUND OF THE INVENTION

The invention relates generally to semiconductor integrated circuit (IC) devices and more particularly, it relates to driver circuits with load discharge detection particularly suitable for use with electro-luminescence (EL) lamps.

EL-lamps are used for backlighting of LCD displays in mobile phones and PDAs. An EL-lamp has a uniform brightness along the lamp area. This is an advantage with respect to backlighting using LEDs because they create bright spots. Since the EL-lamp behaves like a large capacitor, it is driven by an AC voltage of 200–400 Hz. The amplitude of the AC voltage (100–250V) determines the brightness.

EL lamp drivers play an important role in ensuring the uniform brightness of the EL lamp. Conventional EL lamp drivers attempt to achieve the lamp uniform brightness in various ways. Some EL lamp drivers, e.g., Supertex HV824 available from Supertex located in Sunnyvale, Calif., attempt to reduce smoothly the lamp voltage before the opposite polarity of the lamp voltage is built up, without using a controlled constant discharge current. The opposite voltage is connected to the lamp directly which result in abrupt voltage changes. These abrupt voltage changes can result in sound coming from the lamp or electrical disturbance in other parts of the application.

Other EL lamp driver, e.g., the D371 EL lamp driver available from Durel Corporation in Chandler, Ariz. uses a controlled constant discharge current to discharge the EL lamp. However, the time needed for the discharge of the lamp however is not measured but has a fixed relation with the lamp frequency. In most applications, this discharge time will be longer than necessary. This can cause the performance of the EL lamp to degrade, resulting in lower brightness.

Therefore, there is a need for a driver circuit with superior performance.

SUMMARY OF THE INVENTION

The present invention provides a solution that addresses the limiting factors of the conventional driver circuits and has the following advantages. The invention automatically determines the optimal time needed for the discharge of the load. The discharge time adapts itself to different load sizes or load voltages. Also, a minimum amount of time is used to discharge the load, so that a maximum amount of time is available for charging the load at a predetermined frequency. As a result, a higher performance can be achieved. For example, when the invention is used with an EL lamp, a higher brightness can be achieved.

According to one embodiment of the invention, there is provided a driver circuit for driving a load. The driver circuit comprises a sensing circuit that is configured to detect whether the load is substantially discharged and provide an end-of-discharge signal upon detecting a substantial discharge of the load. The driver circuit also includes a controller, operably connected to the sensing circuit, that is configured charging and discharging of the load. The controller starts a new charging cycle to enable charging of the load in response to the end-of-discharge signal.

Other objects and attainments together with a fuller understanding of the invention will become apparent and appreciated by referring to the following description and claims taken in conjunction with the accompanying drawings.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE PREFERRED EMBODIMENTS

Figure 1:
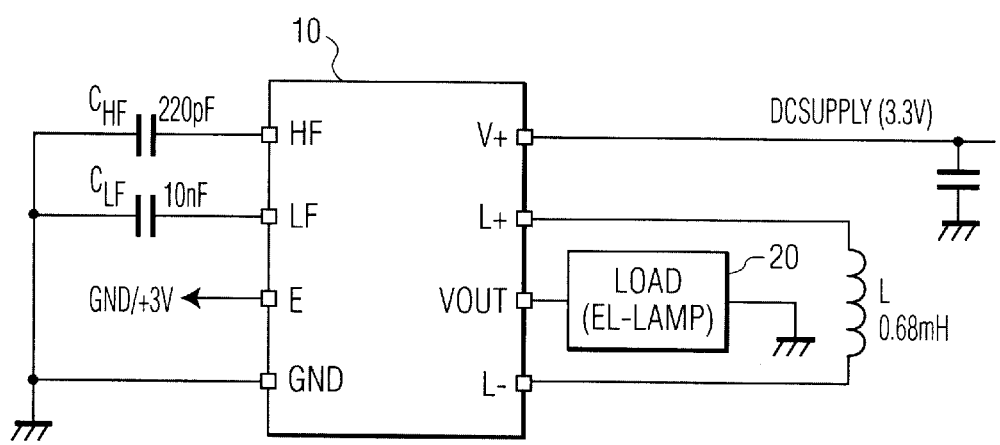
FIG. 1 shows an application of a driver circuit according to one embodiment of the invention.

FIG. 1 shows an application of a driver circuit 10 according to one embodiment of the invention. As shown, driver circuit 10 supplies power to a load, e.g., an EL-lamp 20. Driver circuit 10 powers EL lamp by repeatedly charging an inductor L with current from a low voltage DC supply of about 3.3V and discharging the current into the capacitance of the EL lamp. With each cycle the lamp voltage is increased. After a full charging cycle, the lamp will be discharged in a controlled manner and the lamp will be charged again with an opposite polarity. In this way, a symmetrical voltage with a low frequency is established across the EL lamp.

Figure 2:
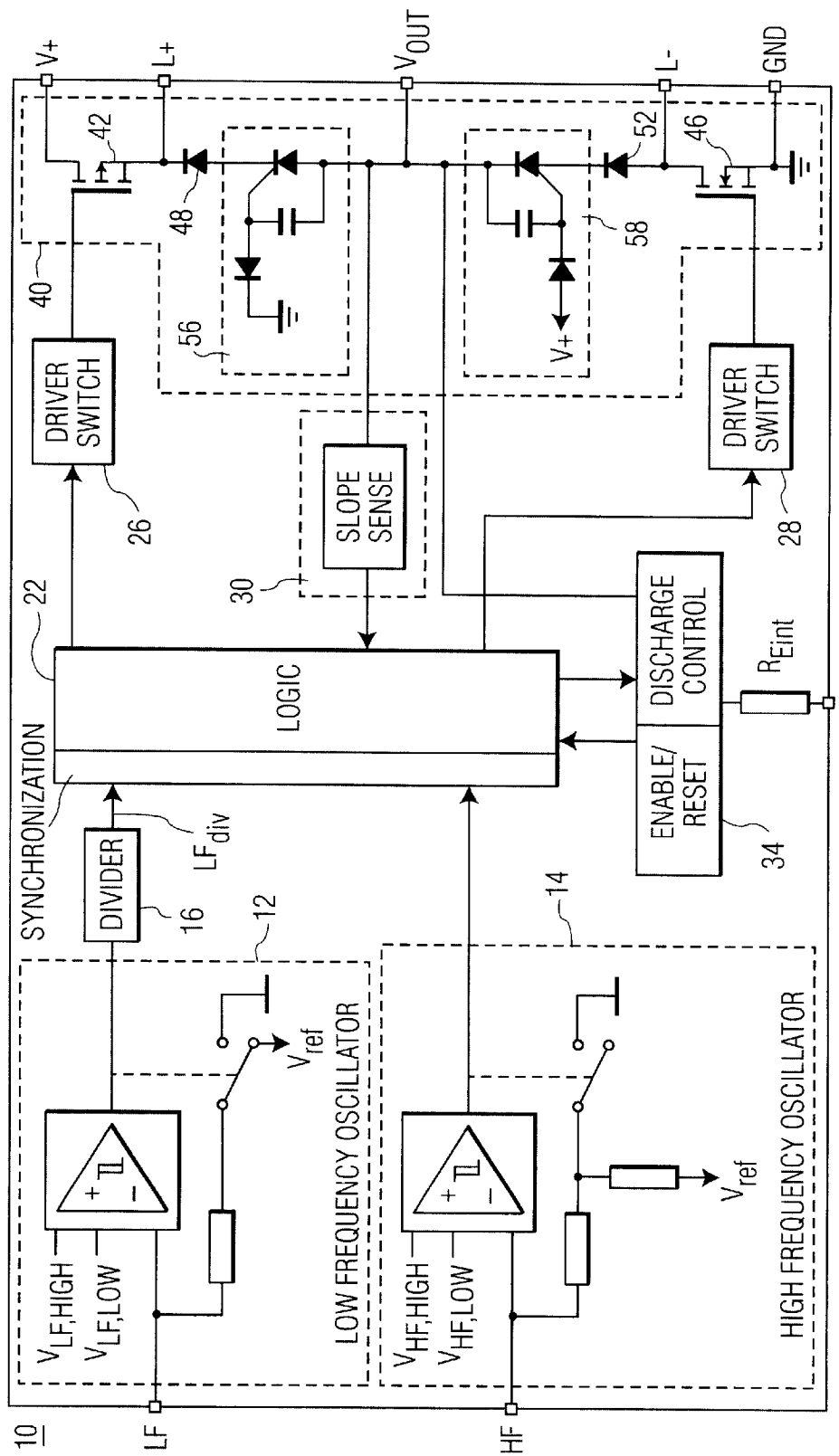
FIG. 2 shows a functional block diagram of a driver circuit according to one embodiment of the invention.

FIG. 2 shows a functional block diagram of driver circuit 10 according to one embodiment of the invention. In driver circuit 10, a low frequency (LF) oscillator 12 provides LF signals to a controller 22 to control the frequency of the load voltage, e.g., the EL lamp voltage. To ensure a 50% duty cycle of the lamp voltage frequency, the LF signals first pass a frequency divider 16 with a divisor of 2 and become LFdiv signals. A high frequency (HF) oscillator 14 provides HF signals to a controller 22 to control the witching frequency of the external inductor L (shown in FIG. 1). LF and HF oscillators 12 and 14 operate independently from each other, but the LFdiv signals at the output of divider 16 are synchronized with the HF signals by controller 22. Synchronization prevents the start of lamp discharge phase while the inductor is being charged and ensures a full first inductor (HF) charging cycle when the lamp charge phase starts.

During each HF cycle a fixed packet of energy is transferred from the inductor to the lamp, thus increasing the lamp voltage at each HF cycle. After a number of HF cycles, charging of the lamp is stopped, the lamp is discharged, and a new charging cycle with an opposite voltage is started. The ratio between the LF and HF oscillator determines how many energy packets are delivered to the lamp before it is discharged. The HF oscillator determines the amount of energy of one packet. So both oscillators determine the amplitude of the lamp voltage, and with that the lamp brightness.

Controller 22 controls an output stage 40 via driver switches 26 and 28 to charge the inductor at nodes L+ and L− and power the lamp at node $V_{out}$, based on detection of the lamp discharge by a slope sense circuit 30. Controller 22 also controls discharging of the lamp by enabling a discharge control circuit 34, which includes sinking and sourcing current sources for discharging the lamp at node $V_{out}$. The value of the discharge current is adjustable by a voltage at the E pin. In driver circuit 10, after the actual discharging of the lamp has started, slope sense circuit 30 detects whether a current still flows through the lamp. A current flows through slope sense circuit 30 as long as the lamp is being discharged and the lamp voltage is being discharged from a high positive value towards 0V or from a negative value towards 0V. After the current stops flowing, slope sense circuit 30 provides an end-of-discharge signal to circuit 34, via controller 22. This happens when the lamp is completely discharged and the value of dV/dt of the lamp voltage becomes zero. At the end of the discharge as detected by slope sense circuit 30, controller 22 will start the next charging cycle.

In driver circuit 10, output stage 40 includes a PDMOS (P-channel Double-diffused MOS) transistor 42, an NDMOS (N-channel Double-diffused MOS) transistor 46, diodes 48 and 52, a cathode triggered switching circuit 56 with gate control, and an anode triggered switching circuit 58 with gate control. The upper half circuit of output stage 40 formed by PDMOS transistor 42, diode 48, and cathode triggered switch circuit 56 is used for negative charging of the lamp. Thus, when the inductor is charged and PDMOS transistor 42 switches off, the current path from the power supply via V+ pin to the inductor via L+ pin is interrupted and the inductor will generate a negative voltage at the L+ pin. The lower half circuit of output stage 40 formed by NDMOS transistor 46, diode 52, and anode triggered switching circuit 58 is used for positive charging of the lamp. Hence, when the inductor is charged and NDMOS transistor 46 switches off, the current path from the inductor via L− pin to the ground via GND pin is interrupted and the inductor will generate a positive voltage at the L− pin.

Figure 3A:
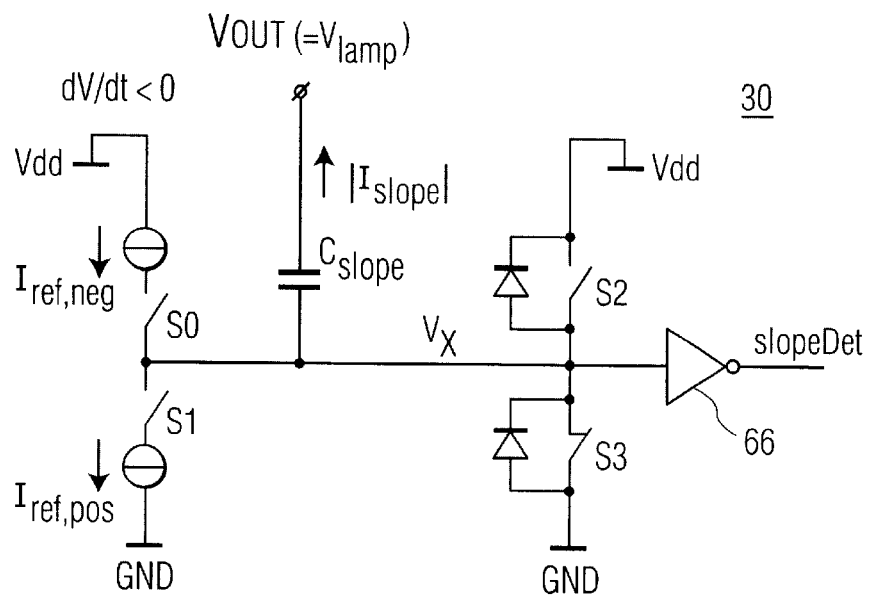
FIG. 3A shows a detailed circuit diagram of a slope sense circuit in a preset state for sensing a negative slope of the load voltage, according to one embodiment of the invention.

FIG. 3A shows a detailed circuit diagram of slope sense circuit 30 in a preset state for sensing a negative slope of the lamp voltage (i.e., dV/dt<0). Slope sense circuit 30 includes a high voltage capacitor $C_{slope}$ (e.g., 4 pF), a pair of current sources $I_{ref,neg}$ and $I_{reg,pos}$, switches $S_0$, $S_1$, $S_2$ and $S_3$, and an inverter 66. Capacitor $C_{slope}$ converts the slope of the lamp voltage into a current. This slope occurs when the current sources of discharge control circuit 34 discharge the lamp at $V_{OUT}$. Current sources $I_{ref,neg}$ and $I_{reg,pos}$ generate negative and positive reference currents, respectively, which are relatively small typically about 0.6 μA. These reference currents are used to compare to the current $I_{slope}$ flowing to or from the lamp to determine whether $I_{slope}$ has become negligibly small. The result slopeDet is output to controller 22 (FIG. 2) as the end-of-discharge signal. In circuit 30, switches $S_0$ to $S_3$ may be implemented with MOS transistors and are controlled by controller 22.

Slope sense circuit 30 will be kept in the preset state, as shown in FIG. 3A, during a "deadtime" which is introduced to ensure that the actual discharging of the lamp has started before the sensing of the negative slope is initiated. The deadtime is set to be equal to the on-time of one cycle of the HF signal.

In this preset state, switch $S_3$ is closed for preconditioning before the negative slope is sensed, so that node voltage $V_x$ is discharged to-ground level. By presetting slope sense circuit 30 in this way, the output slopeDet will toggle when the slope of the lamp voltage is less than 0.2V/μs. This value is determined by $C_{slope}$ and the reference current from dV/dt=$I_{ref}/C_{slope}$.

Figure 3B:
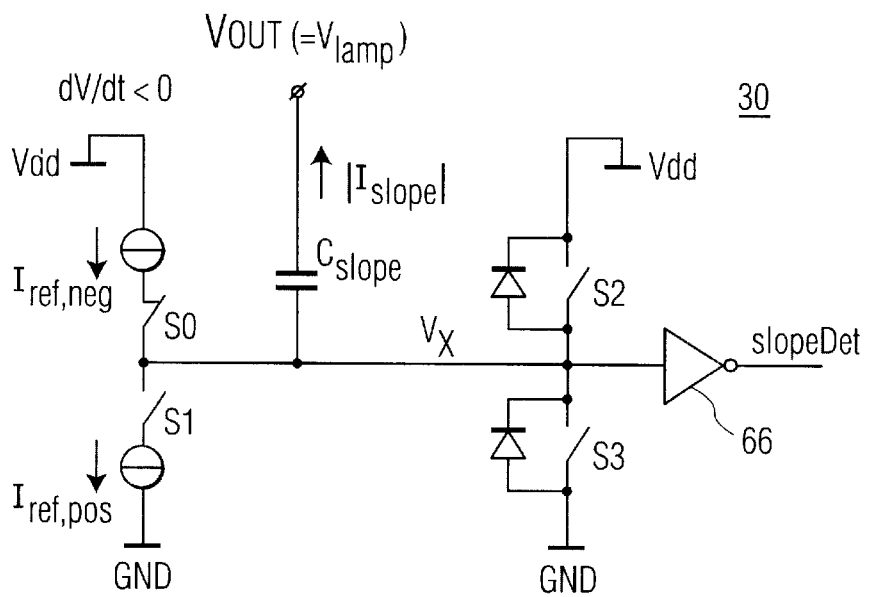
FIG. 3B illustrates the slope sensing circuit of FIG. 3B in a normal operation for sensing a negative slope of the load voltage.

FIG. 3B illustrates slope sensing circuit 30 in a normal operation for sensing a negative slope of the lamp voltage. As shown, only switch $S_0$ is closed to allow the negative reference current to be used for comparison with $I_{slope}$, which is proportional to the slope of the lamp voltage. While $|I_{slope}|>I_{reg,neg}$, it indicates that the lamp is still being discharged. Under that condition, the voltage $V_x$ will be clamped at $V_{gnd}-V_{diode}$, where $V_{diode}$ is the voltage across the backgate diode of switch $S_3$. Thus, Vx is kept at a low state (about 0V) by the difference between $|I_{slope}|$ and $I_{reg,neg}$. Therefore, the output slopeDet is at a logic high (H), which is sent to controller 22 shown in FIG. 2. This allows controller 22 to provide an active (high) enDischarge signal to discharge control circuit 34 to keep discharging the lamp.

When the slope of the lamp voltage becomes less than 0.2V/μs, at which time $|I_{slope}|<I_{reg,neg}$, it indicates that the lamp is completely discharged. Thus, Vx will be positively charged with the difference between $|I_{slope}|$ and $I_{reg,neg}$. At this time, the voltage $V_x$ is clamped at $V_{dd}+V_{diode}$, where $V_{diode}$ is the voltage across the backgate diode of switch $S_2$. This results in slopeDet at a logic low (L), which is provided to controller 22 (in FIG. 2) to indicate that the lamp is completely discharged. Controller 22 then outputs an inactive (low) enDischarge to discharge control circuit 34, which ends the lamp discharge current. Controller 22 also generates an active (high) enCharge signal to control driver switches 26 and 28 to start the next charging cycle.

Figure 3C:
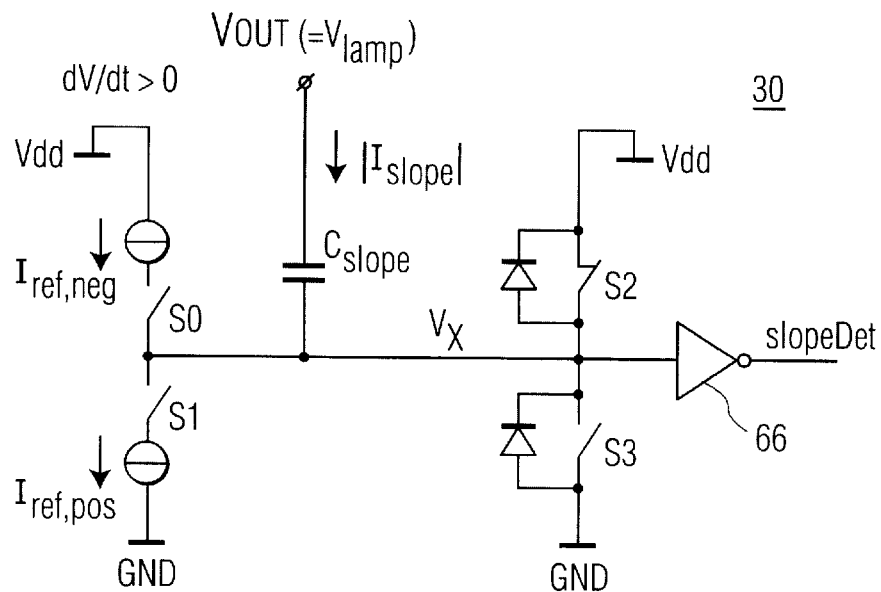
FIG. 3C shows the slope sensing circuit of the embodiment of the invention in a preset state for sensing a positive slope of the load voltage.
Figure 3D:
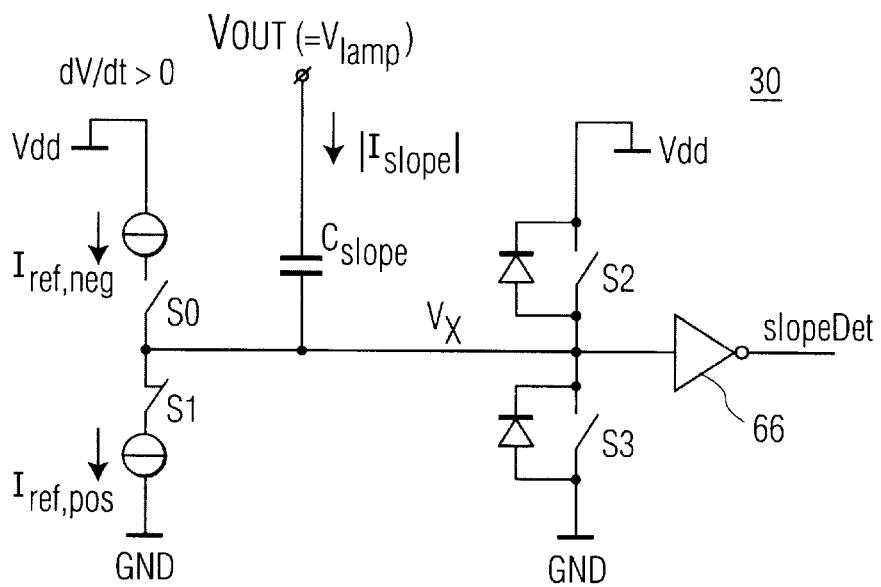
FIG. 3D shows the slope sensing circuit of FIG. 3C in a normal operation for sensing a positive slope of the load voltage.

FIG. 3C shows slope sensing circuit 30 in a preset state for sensing a positive slope of lamp voltage (i.e., dV/dt>0), in which switch $S_2$ is closed for preconditioning before a positive slope is sensed. FIG. 3D illustrates slope sensing circuit 30 in a normal operation for sensing a positive slope of the lamp voltage, in which switch $S_1$ is closed. The operations of circuit 30 in FIGS. 3C and 3D are similar to those shown in FIGS. 3A and 3B. Therefore, the relevant description is omitted for simplicity.

Figure 4A:
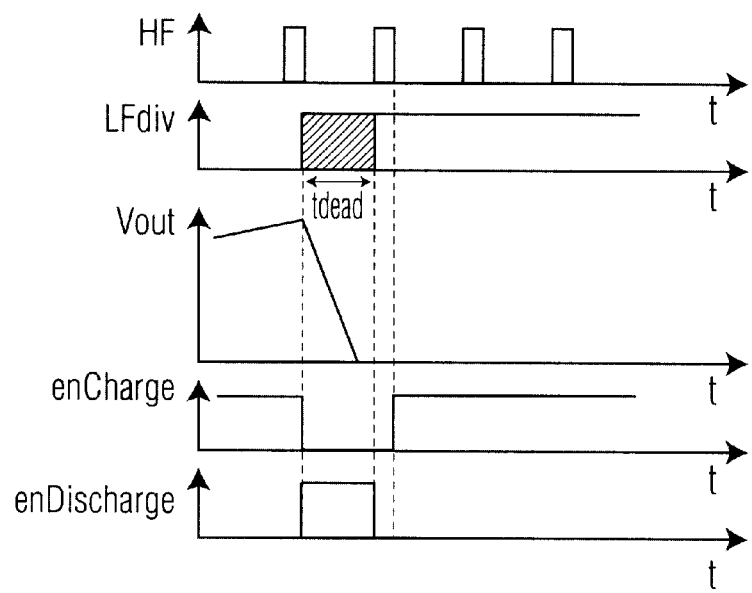
FIGS. 4A and 4B are timing diagrams illustrating two different discharging situations.
Figure 4B:
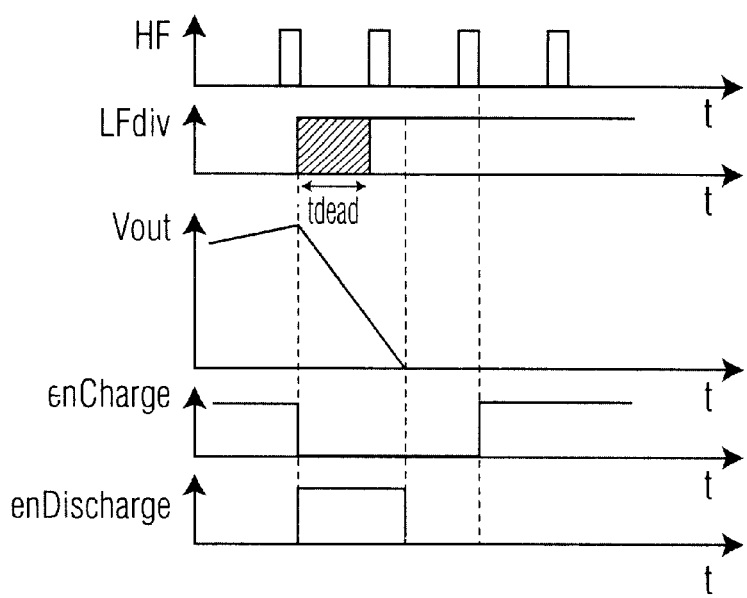

FIGS. 4A and 4B are timing diagrams for two different discharging situations. As shown in FIG. 4A, the rising edge of LFdiv signals enables the negative discharging of the lamp. On the other hand, the positive discharging is initiated by the falling edge of the LFdiv signals (as shown in FIG. 5).

As previously described, the sensing of the voltage slope starts after the deadtime, i.e., tdead seconds after the edge of the LFdiv signals. In FIG. 4A, the discharging of the lamp is completed within the deadtime. In this case, the control signal enDischarge will be disabled by controller 22 immediately after the deadtime. To prevent unbalanced positive and negative lamp voltage amplitudes, each HF cycle will be fully utilized. A main reason for this is that the presence of an average DC voltage across an EL-lamp reduces lifetime, so the positive and negative lamp voltage amplitude should be equal. By waiting for the next HF cycle, the first charging cycle is always a complete HF cycle with a fixed and well known charge. Thus, charging of the lamp is started at the beginning of the next HF cycle after the deadtime, which results in the enCharge signal being enabled at H.

FIG. 4B illustrates a situation in which the discharging process takes longer than the tdead seconds. In this case, the enDischarge signal will be disabled immediately after detection of the completion of the lamp discharge. The control signal enCharge is activated by controller 22 at the beginning of the next HF cycle after the detection.

Figure 5:
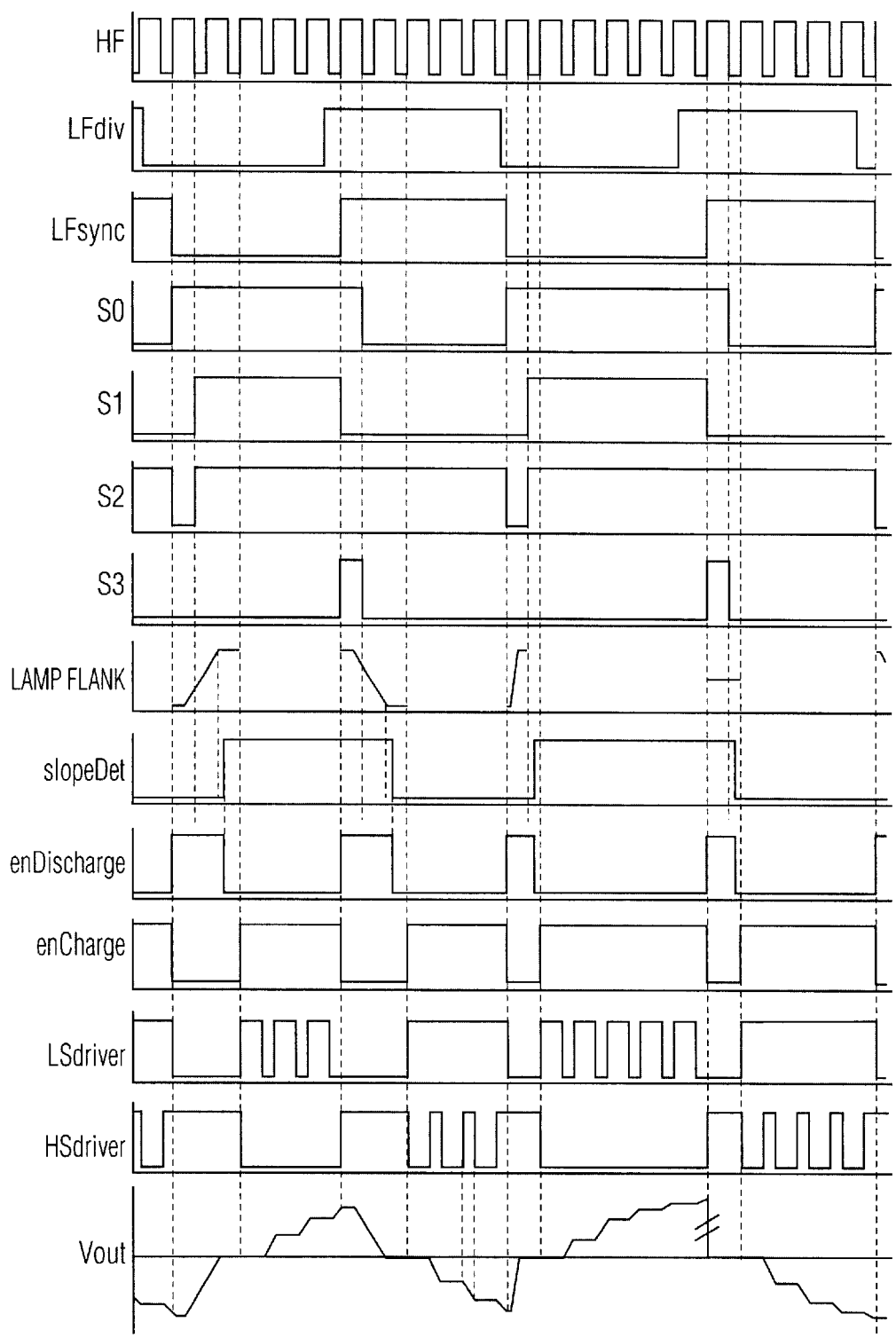
FIG. 5 shows a more detailed timing diagram illustrating various signals and their states under different conditions.

FIG. 5 shows a more detailed timing diagram that illustrates various signals and their states under different conditions. In FIG. 5, the LFsync is the LFdiv signal after being synchronized with the HF signal. The LSdriver signal shows the input and output of driver switch 28, whereas the HSdriver signal shows the input and output of driver switch 26. Moreover, the lamp flank, signal illustrates a detailed aspect of the Vout signal for clarity purpose, showing only the discharging slope part of Vout.

While the invention has been described in conjunction with specific embodiments, it is evident that many alternatives, modifications and variations will be apparent to those skilled in the art in light of the foregoing description. For example, the invention may be used in full-bridge applications where it is beneficial to discharge a capacitive load before charging starts. Accordingly, it is intended to embrace all such alternatives, modifications and variations as fall within the spirit and scope of the appended claims.

What is claimed is:

1. A driver circuit for driving a load, comprising:
   a sensing circuit that is configured to detect whether the load is substantially discharged and provide an end-of-discharge signal upon detecting a substantial discharge of the load; and
   a controller, operably connected to the sensing circuit, that is configured to control charging and discharging of the load;
   wherein the controller starts a new charging cycle to enable charging of the load in response to the end-of-discharge signal.

2. The circuit of claim 1, wherein the sensing circuit detects whether the load is substantially discharged by sensing a slope of a voltage of the load with respect to time.

3. The circuit of claim 2, wherein the sensing circuit senses the slope of the load voltage a predetermined time duration after the load has started to discharge.

4. The circuit of claim 3, wherein the sensing circuit includes:
   a high voltage capacitor having its first end for connecting to the load;
   a current source, connected to a second end of the capacitor, that is configured to generate a reference source for comparing with a current flowing in the load; and
   a presetting circuit that is configured to preset the sensing circuit in a predefined state for sensing the slope of the load voltage.

5. The circuit of claim 4 further comprising:
   a low frequency oscillator that is configured to generate low frequency signals that are provided to the controller to control discharging of the load; and
   a high frequency oscillator that is configured to generate high frequency signals that are provided to the controller to control charging of the load.

6. The circuit of claim 4, wherein the current source generates a negative reference current for comparing with a negative current flowing in the load.

7. The circuit of claim 6, further comprising a second current source that is configured to generate a positive reference current for comparing with a positive current flowing in the load.

8. A portable device, comprising:
   a processor that is configured to receive input signals and provide output signals;
   an electro-luminescence (EL) lamp; and
   a driver circuit operably connected to the lamp, the driver circuit including:
      a sensing circuit that is configured to detect whether the load is substantially discharged and provide an end-of-discharge signal upon detecting a substantial discharge of the lamp; and
      a controller, operably connected to the sensing circuit, that is configured to control charging and discharging of the lamp;
      wherein the controller starts a new charging cycle to enable charging of the lamp in response to the end-of-discharge signal.

9. The device of claim 8, wherein the sensing circuit detects whether the lamp is substantially discharged by sensing a slope of a voltage of the lamp with respect to time.

10. The device of claim 9, wherein the sensing circuit senses the slope of the lamp voltage a predetermined time duration after the lamp has started to discharge.

11. The device of claim 10, wherein the sensing circuit includes:
    a high voltage capacitor having its first end for connecting to the lamp;
    a current source, connected to a second end of the capacitor, that is configured to generate a reference source for comparing with a current flowing in the lamp; and
    a presetting circuit that is configured to preset the sensing circuit in a predefined state for sensing the slope of the lamp voltage.

12. The device of 11, further comprising:
    a low frequency oscillator that is configured to generate low frequency signals that are provided to the controller to control discharging of the lamp; and
    a high frequency oscillator that is configured to generate high frequency signals that are provided to the controller to control charging of the lamp.

13. The device of claim 11 wherein the current source generates a negative reference current for comparing with a negative current flowing in the lamp.

14. The device of claim 13, further comprising a second current source that is configured to generate a positive reference current for comparing with a positive current flowing in the lamp.

* * * * *